United States Patent [19]
Cook et al.

[11] Patent Number: 5,966,301
[45] Date of Patent: *Oct. 12, 1999

[54] REDUNDANT PROCESSOR CONTROLLER PROVIDING UPGRADE RECOVERY

[75] Inventors: William B. Cook, Northfield Center; Mark A. Flood, Mayfield Heights; Steven P. Richter, South Euclid; Mark E. Taylor, Chesterland; Bradley J. Bittorf, Novelty, all of Ohio

[73] Assignee: Allen-Bradley Company, LLC, Milwaukee, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/876,154

[22] Filed: Jun. 13, 1997

[51] Int. Cl.$^6$ ................................................. G05B 15/00
[52] U.S. Cl. ........................ 364/132; 364/133; 364/134; 364/186; 364/187
[58] Field of Search ..................................... 364/132, 184, 364/185, 186, 187, 188, 191, 131–139, 159, 146, 147, 189, 192, 193; 395/155, 159, 161, 500, 700; 371/21.1, 21.2

[56] References Cited

U.S. PATENT DOCUMENTS

| | | | |
|---|---|---|---|
| 5,136,498 | 8/1992 | Mclaughlin et al. | 364/184 |
| 5,142,470 | 8/1992 | Bristow et al. | 364/184 |
| 5,313,386 | 5/1994 | Cook et al. | 364/187 |
| 5,515,501 | 5/1996 | Laberge et al. | 395/182.08 |
| 5,530,643 | 6/1996 | Hodorowski | 364/191 |

*Primary Examiner*—William Grant
*Assistant Examiner*—Ramesh Patel
*Attorney, Agent, or Firm*—Keith M. Baxter; John M. Miller; John J. Horn

[57] ABSTRACT

An industrial controller provides a primary controller and a redundant secondary controller and allows switchover between the controllers in the event of a failure in the primary controller. The process of qualification of the secondary controller in which its programming is made to match the primary controller may be inhibited to permit the secondary controller to maintain a clean version of an upgraded program executing on the primary controller. The clean program may be reverted to in the event an upgrading of the program in the primary controller is unsuccessful. Switchover is permitted even though the qualification of the secondary controller is not enabled.

7 Claims, 4 Drawing Sheets

REDUNDANT PROCESSOR CONTROLLER PROVIDING UPGRADE RECOVERY

BACKGROUND OF THE INVENTION

The present invention relates to industrial controllers and in particular to industrial controllers having a modular construction that permits upgrading of the modules during operation of the industrial controller.

Industrial controllers are special purpose computers used for controlling factory automation and the like. Under the direction of a stored program, a processor of the industrial controller examines a series of inputs reflecting the status of a controlled process and changes outputs affecting control of the controlled process.

Typically, the stored program will be unique to the particular control application. Perfecting this control program will frequently require testing of the control program with the actual equipment being controlled.

The circuitry, or hardware configuration of the industrial controller may also be unique to the particular application. Different applications will generally require different numbers and types of I/O circuits depending on the inputs and outputs needed for the controlled process. Some applications will require circuitry to handle specialized control or communication tasks.

For this reason, it is typical to construct the industrial controller in a modular fashion, having one or more functional modules connected together through a common backplane in a rack or the like. The modular construction allows the circuitry of the industrial controller to be customized to some degree for each application and simplifies maintenance and repair of the industrial controller in the event that one or more modules fail.

Normally, the controlled process and the technology of the industrial controller will evolve over time. As a result it may be necessary to modify the control program and upgrade the functional modules of the industrial controller. The functional modules may also need to be changed as part of normal maintenance and repair.

In such cases, the control system may be stopped, the old functional modules removed from the backplane, and the new modules replaced. Similarly, the control system may be stopped to add a new program to the industrial controller or to modify its existing program.

The economics of certain controlled processes, for example manufacturing facilities, make shutting down the controlled process for upgrading of the control system prohibitively expensive. In some batch-type processes, shutting down the process for unscheduled maintenance may cause damage to equipment and spoilage of processed items.

Accordingly, it is desirable that such upgrading and changes of the control system be performed without stopping the controlled process or with only minimal disruption.

To minimize process disruption in changing the control program, it is known to provide for a conditional editing of the control program. Here, two versions of the control program are effectively held on the controller. The controller is then configured to toggle between the versions depending on the state of an internal edit flag. This toggling may occur while the controller is operating.

Upgrading functional modules is more difficult. Removing a functional module while the controlled process is under way may cause unexpected changes in the controller's outputs. Even if the particular functional module were not critical, its loss might provoke a fault condition in the controller, stopping the controlled process entirely. A new functional module replaced in the controller will require some time to re-establish communication with the remainder of the industrial controller.

If the upgrading of the functional module is unsuccessful in some way, additional disruption of the controlled process upon reinsertion of the old module would be inevitable.

BRIEF SUMMARY OF THE INVENTION

The present invention permits the upgrading of the hardware or software of an industrial controller during the control process with minimal down time, and importantly, with the ability to effectively undo the upgrading rapidly if its process or application is unsuccessful.

Generally, the controller includes a redundant primary and secondary controller coordinated with each other so that the secondary controller may take over the control from the primary controller on the occurrence of a switch-over signal. The coordination between controllers is provided by a process termed 'qualification' in which the program and data memories and program state of the primary and secondary processors are made to match. In the present invention this qualification process may be suspended, by the setting of a flag, without preventing switch-over. By suspending the qualification process (and subsequent synchronization), the upgrading of one controller does not contaminate the back-up controller which may then be used to recover from unsuccessful upgrading.

Specifically, the present invention provides a secondary industrial controller used for backup for a primary industrial controller, the primary industrial controller having primary functional modules and having a primary memory containing a user program executed to control an industrial process. The secondary industrial controller similarly includes secondary functional modules and a secondary memory which has a version of the user program and a state flag which may be set by user command. The secondary industrial controller also includes a backup circuit communicating with the memory and the functional modules and operating to detect a lack of coherence between the primary functional modules and the secondary functional modules and between the user program and the version of the user program. When a lack of coherence is detected by the back-up circuit, and only when the state flag is not set, the secondary controller copies the user program from the primary controller to the secondary memory.

Thus it is one object of the invention to expand the function of a secondary controller in a redundant control system to include facilitating the upgrading of control software. Normally, a secondary controller will qualify itself so that it is coherent with the primary controller. The qualification process ensures that during switchover, there will be no disruption to the control process, but can cause the secondary controller to be loaded with a possibly unsuccessful software upgrade of the primary controller. This limits the usefulness of the secondary controller as a back-up system.

The present invention, by allowing a temporary disabling of the qualification process, permits one controller to be used as a test platform for software upgrades while the other controller is held in its previous configuration in case the upgrade is unsuccessful.

The blocking of the qualification process may occur in either the original primary or original secondary controller to cover situations where qualification is triggered after a switchover. Either the primary or secondary controllers may serve as the repository of the unchanged software.

The backup circuit may further operate to execute the program in the secondary memory to control the industrial process upon receipt of a switchover signal unless a lack of coherence is detected and the state flag is not set.

Thus it is another object of the invention to permit a switchover between controllers even though coherence has not been maintained if that intent is manifest in the flag setting, and otherwise to prevent such switchover if there is lack of coherence.

The backup circuit may receive as the switchover signal, a signal from the primary controller indicating a condition consisting of the group of failure of a primary functional module or a removal of or insertion of a primary functional module.

DETAILED DESCRIPTION OF THE INVENTION

Controller Hardware

Figure 1:
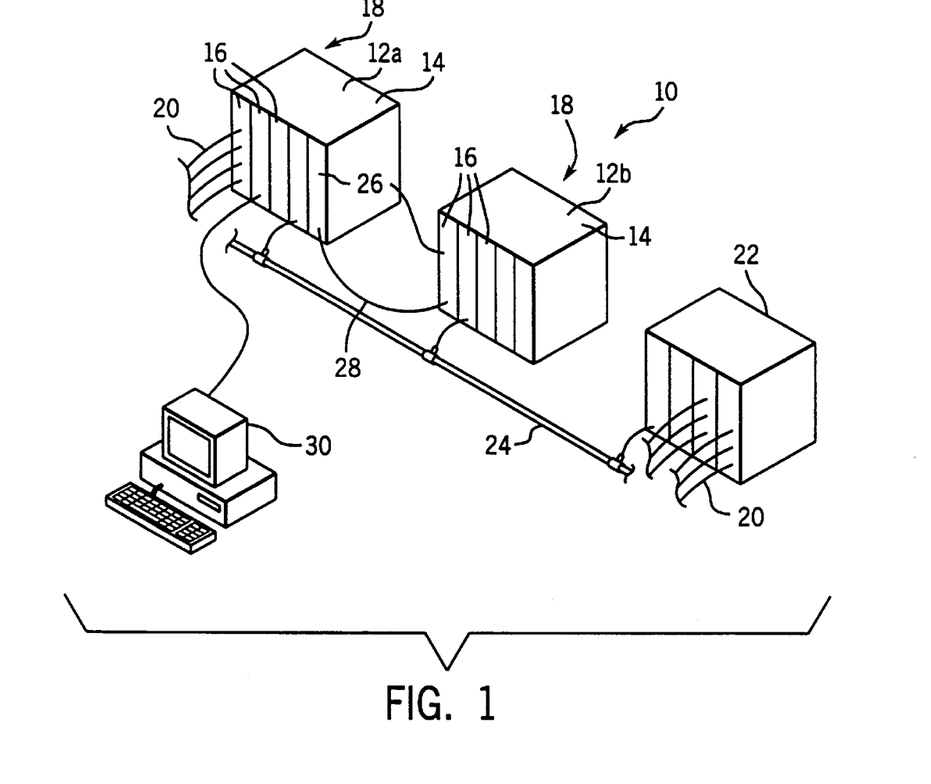
FIG. 1 is a simplified perspective view of an industrial controller having a primary and secondary controller, each composed of functional modules connected by a backplane and contained in separate racks.

Referring now to FIG. 1, an industrial control system 10 of the present invention includes a primary controller 12*a* and a secondary controller 12*b* housed in separate racks 14. Each of the racks 14 include multiple functional modules 16 electrically communicating via a backplane 18 comprised of multiple conductors running along the back of the racks 14.

Included among the functional modules 16 may be a communication module permitting communication between the controller 12*a* and controller 12*b*, as well as the remote I/O rack 22 along common high-speed link 24. The remote I/O rack 22 includes multiple I/O modules communicating with the controlled process also through lines 20. The I/O modules, communications modules and I/O rack operate generally according to methods well understood in the art with exceptions to be described below.

Controller 12*a* and controller 12*b* may also be connected via the same or a separate communication channel to a programming terminal 30 being of a conventional desktop computer design.

Figure 2:
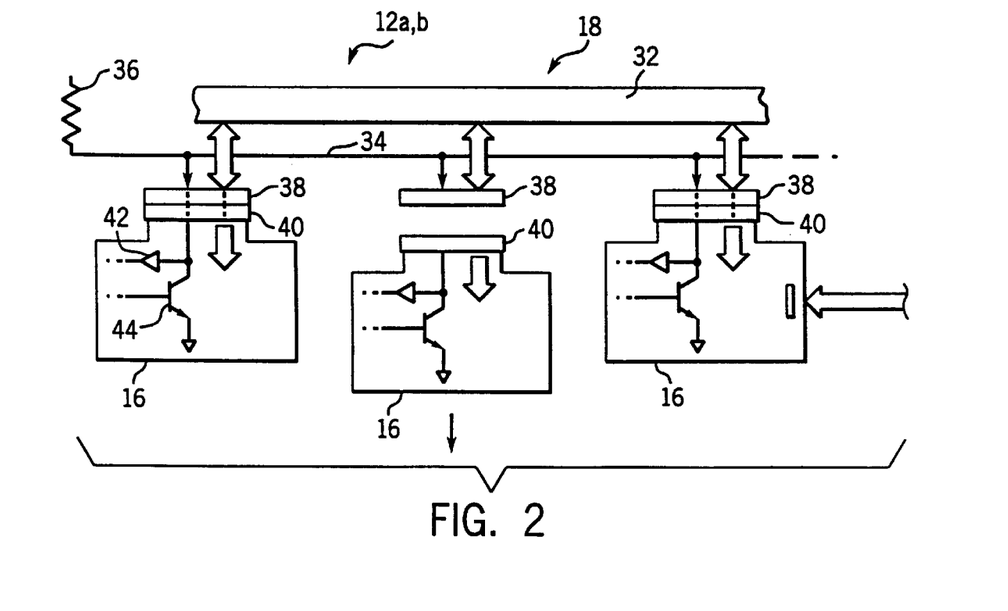
FIG. 2 is a block diagram of the functional modules of the primary controllers of FIG. 1 showing connection of the functional modules to the backplane including a fault status line and the removal of one functional module.

Referring now to FIGS. 1 and 2, the backplane 18 includes a parallel bus 32 for high-speed connected messaging between the functional modules 16. The backplane 18 also includes a system failure line 34 which is pulled to a high state in the absence of failure by a pull-up resistor 36.

Spaced along the backplane 18 within the racks 14 are multi-pin connector halves 38 receiving corresponding connector halves 40 attached to the functional modules 16. When a functional module 16 is connected to the backplane 18, the multi-channel bus 32 and the system failure line 34 are electrically connected to the electronics on the functional modules 16 for the exchange of information.

On each functional module 16, the system failure line 34 is received by a card input 42 so that the functional modules 16 may monitor the status of the system failure line 34. On each functional module 16, the system failure line 34 is also connected into a pull-down transistor 44 for asserting the system failure line by pulling it to a low voltage.

As will be understood from this description, the system failure line 34 provides an effective logical OR of failure signals from the individual functional modules 16. Thus, the system failure line 34 signals a failure of at least one functional module 16, but does not distinguish which modules 16 have failed, or how many modules 16 have failed. Importantly, it will be understood that if the functional module 16 is removed from connector half 38, as would be the case in an upgrading of the module 16 during operation of the controller, then the system failure line 34 cannot be asserted and normally no failure is indicated.

Figure 3:
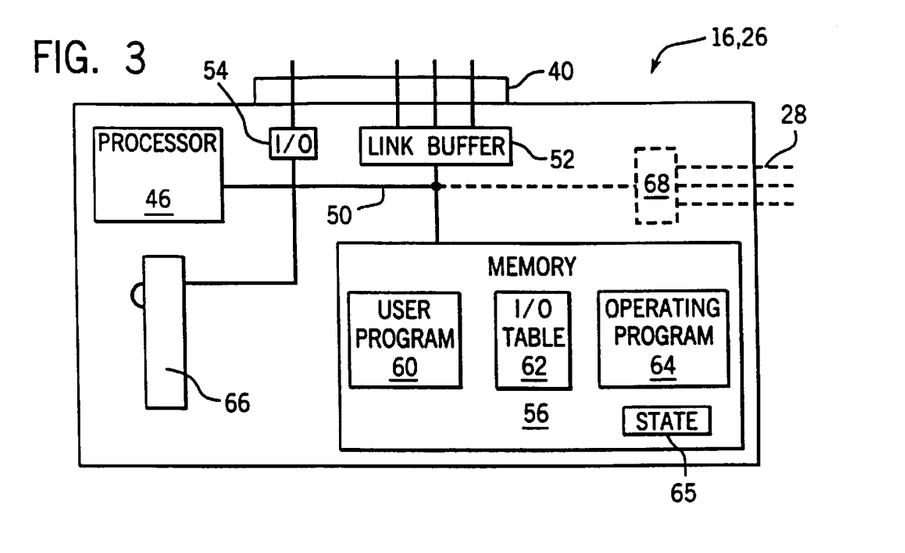
FIG. 3 is a block diagram of a functional module of FIG. 2 showing the allocation of memory to a control program, I/O data, configuration flags and an operating system.

Referring now to FIG. 3, a typical functional module 16 will include a processor 46 connected via an internal bus 50 to a link buffer 52 communicating with the connector 40 and ultimately with the bus 32. The bus 50 may also communicate with the card input 42 and pull-down transistor 44 (described above and shown in FIG. 2) collected as I/O 54 in FIG. 3. Bus 50 may also connect to various front panel displays 66 including status lights and the like.

An electronic memory 56, including volatile and non-volatile memory components well understood in the art, is also connected to bus 50 to communicate with the processor 46. Memory 56 holds a user program 60 written to control the particular industrial application at hand. An I/O table 62, of a type understood in the art, is also contained in memory 56 and stores the input and output values exchanged with the controlled process over lines 20, either directly by the functional module 16 or via other functional modules as transferred through the link 24 or the backplane 18. Generally, as is understood in the art, the I/O table 62 is asynchronously updated by special purpose hardware, and the processor 46 accesses the I/O table 62 as updated in the manner of conventional memory.

An operating system program 64 is also contained in memory 56 to provide a number of features related to the present invention as will be described.

Also included in memory 56 are configuration flags 65 recording the state of the module 16 generally, and in the system back-up modules 26 indicating whether the particular controller 12*a* or 12*b* is a primary controller or secondary controller, and if a secondary controller whether it is in a standby, disqualified or qualified mode, as will be described below. The flags also indicate whether auto-qualification shall be performed as will be described. The configuration flags 65 in memory 56 may be set by user command or by execution of the operating system 64 as will be described.

Referring now to FIGS. 1 and 3, the controllers 12a and 12b also each include a system back-up module 26 coordinating back-up operation between the primary controller 12a and secondary controller 12b. The system back-up modules 26 communicate via a special-purpose, interchassis data link 28.

The system back-up module 26 is similar to the other functional modules 16, however, in the system back-up modules, the memory 56 does not store the user program 60 or the I/O table 62. In addition, the system back-up modules 26, storing a different operating system 64, operate to coordinate back-up activities as will be described.

Like other functional modules 16, the system back-up modules include the connector 40 to connect them to the bus 32 and to the system failure line 34. In addition, the system back-up modules 26 include a special buffer 68 communicating with the inter-chassis data link 28 described above. This link allows the system back-up modules 26 to coordinate activities between the primary and secondary controllers in providing back-up for one another without need for or interference with the link 24 (which is independently susceptible to failure).

Figure 4:
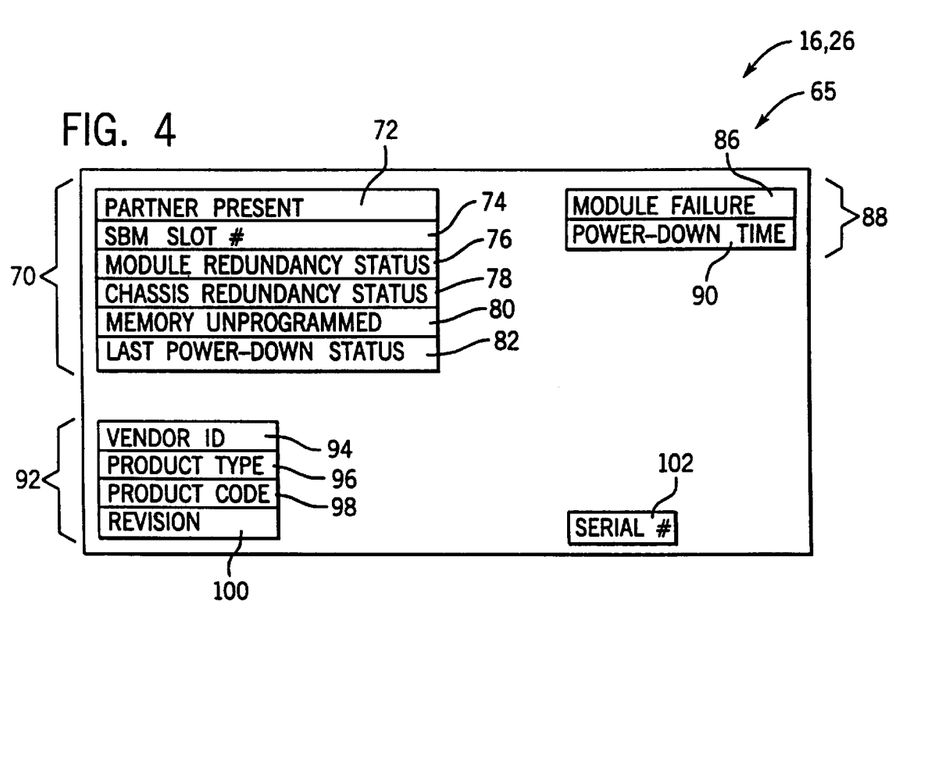
FIG. 4 is a figure similar to FIG. 2 showing the functional modules on both a primary and secondary controller and depicting the flow of data when a functional module is removed.

Referring now to FIGS. 2 and 4, in the present invention the functional modules 16 may be freely removed from their racks 14 during operation of the controllers 12a and 12b. For this reason, special provisions must be made to detect such removal and to coordinate a transfer of control between the primary controller 12a and secondary controller 12b when a module is removed.

Operation of the System Back-up Modules

Referring now to FIG. 4, first controller 12a may include a system back-up module 26a and two functional modules 16a and 16a', the latter of which will be removed. Second controller 12b includes a back-up module 26b and two functional modules 16b (only one of which is shown). In the following discussion, it will be understood that the primary and secondary controller are perfectly symmetric and that the term "primary" and "secondary" refer only to which controller was most recently controlling the process. It will be assumed that first controller 12a is initially the primary controller.

Qualification

During normal operation of the controllers 12a and 12b, first controller 12a will act as a primary controller, actively controlling an industrial process in the manner of a conventional industrial controller. In order that the second controller 12b be prepared to undertake control of that process if controller 12a is incapacitated, it is necessary that controller 12b have the same user program 60 and I/O table 62 as that present in primary controller 12a.

This coordination of the controllers 12a and 12b is provided by a process termed "qualification" in which there is a cross-loading of the memories 56 of the first controller 12a and the second controller 12b. Qualification is followed by a constant updating of the I/O tables as they change (synchronism).

Periodically, auto-qualification (if enabled) will occur if there is an indication that the 'coherence' between the primary controller 12a and secondary controller 12b has been lost. Coherence indicates that the program 60 in the primary controller 12a and secondary controller 12b are identical, and that the hardware configurations as reflected in the functional module 16 are the same. Events indicating a lack of coherence, detected by either system back-up module 26, will trigger an auto-qualification of the then secondary controller. Such events include start up of the industrial controller, removal or replacement of functional modules 16.

More specifically, two autoqualification flags 65 are stored in memory 56. The first is user setable and has three possible values: Never Autoqualify, Always Autoqualify, and Conditionally Autoqualify. The second flag (termed the state flag) holds the current state of autoqualification : enabled or disabled. The state flag is set to enabled when the user selects Always Autoqualify and set to disabled when the user selects Never Autoqualify. When the user selects Conditionally Autoqualify, the state is left unchanged but will change when any of the following occur:

| Occurrence | Effect on Flag |
| --- | --- |
| Qualification command received | Enabled |
| Disqualify Secondary command received | Disabled |
| Enter Standby command received | Disabled |
| Swap to Standby Command received | Disabled |

Qualification is performed under the operating systems of the system back-up modules 26 and includes three stages. In a first stage, it is verified through the system back-up modules 26a and 26b, that each functional module 16 in the primary controller has a corresponding module 16 with similar configuration in the other controller 12. In the second stage, the memory 56 of each module 16 of the primary controller 12 is cross-loaded to the memory of the secondary controller 12. This cross loading includes the user program 60 and the I/O table 62. In the third stage, changes to the configuration flags 65 and programs 60 which have been locked out in stage one are released. After qualification is successfully completed, the system back-up modules 26a and 26b check to see if a switch-over should occur.

Detecting Module Removal

During operation of the controllers 12, the circuitry of the link buffer 52 (shown in FIG. 3) of the system back-up modules 26 monitors activity on the backplane 18 by the other modules 16. The system back-up module 26a then polls the functional modules 16a and 16a' not having recent activity with polling message 70. In this polling process, system back-up module 26a sends a message to functional module 16a which then responds indicating receipt of the message. System back-up module 26a then sends a similar polling message 70 to functional module 16a' and so forth for each functional module, whereupon the process is repeated as frequently as once every 5 milliseconds. Importantly, this polling process does not require processor 46 to be diverted from its tasks and because only 'quiet' modules 16 are polled, bandwidth of the backplane 18 is preserved.

When functional module 16a' is removed from the backplane 18 over which these messages are sent and received, it will either be unable to receive the polling message or unable to respond. This indicates to system back-up module 26a that module 16a' has been removed from the backplane 12. At this time, system back-up module 26a, according to instructions from its operating system, sends a switch-over signal 72 to its companion back-up module 26b in secondary controller 12b. Simultaneously, system back-up module 26a sends a shut-down message 73 to the remaining connected modules 16a to cease operation. System back-up module 26b in turn sends start-up messages 74 to its modules 16b, activating them for control.

In the event that the system back-up module 26a is removed, the switching to the secondary chassis must be accomplished by the remaining back-up module 26b detecting a loss of communication with module 26a. In this case, it is important that functional modules 16a stop functioning as if they had received shut-down message 73 from the system back-up module 26a.

To accomplish this purpose, the system back-up module 26a designates one of the functional modules 16a to periodically send a reverse polling message 75 to the system back-up module 26a. In the event that the designated module 16a detects a removal of the module 26a, it provides the necessary shut-down message 73 to the other modules 16a as indicated by phantom line 73'. The selection of this module 16a as the designated functional module is performed at the time of power-up or if no suitable modules are available at power-up, when a suitable module is inserted.

Alternatively, all modules may detect removal of the system back-up module by sending polling messages when no activity has been detected. In this way, no communication between remaining modules is required but they may shut down independently.

Responding to Module Removal

Figure 5:
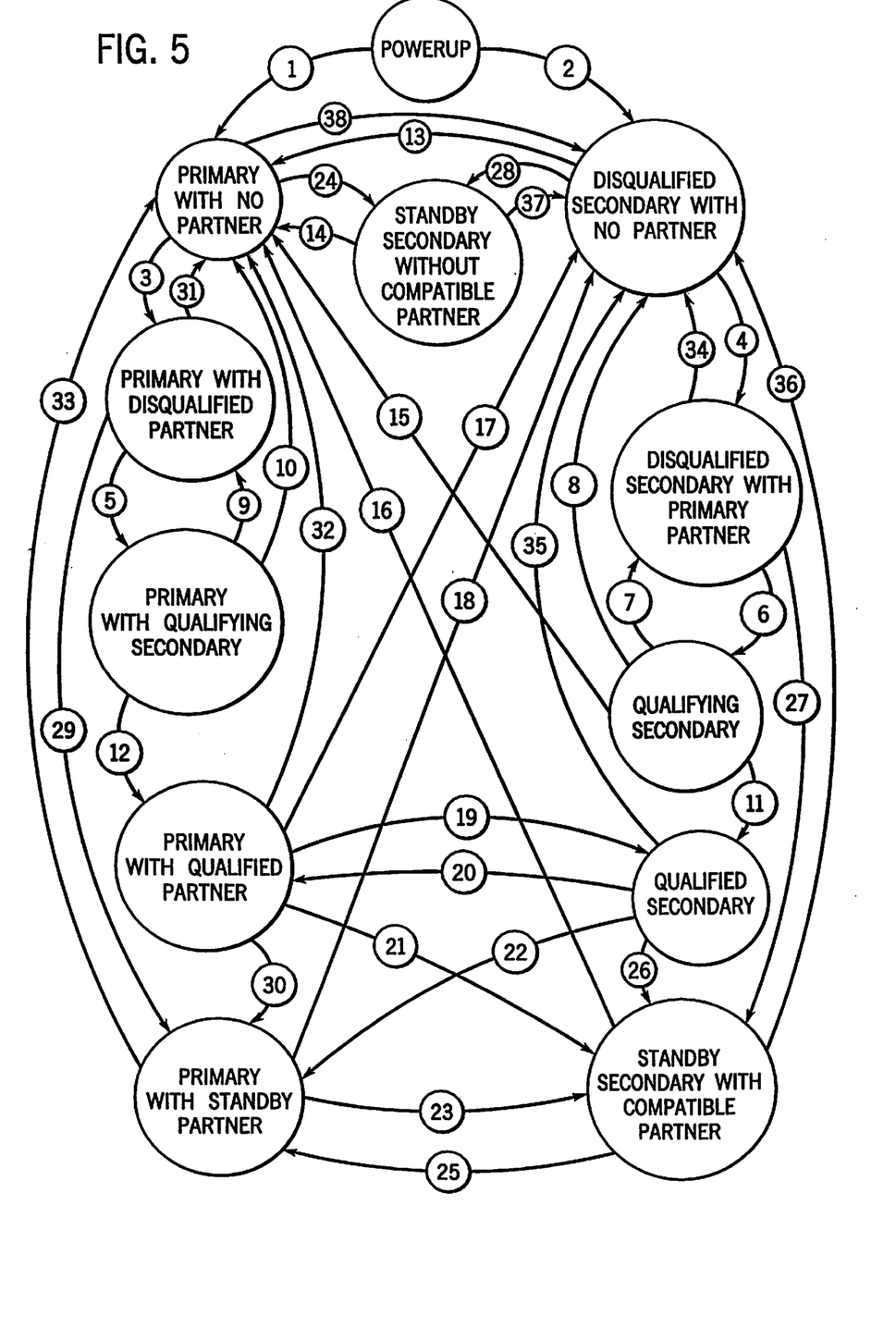
FIG. 5 is a flow chart describing the steps of the operating system program of FIG. 3 as executed by a functional module to cause the switch-over of control from the primary controller, and an attempted auto-qualification of the primary controller when a functional module is removed from the primary controller.
Figure 6:
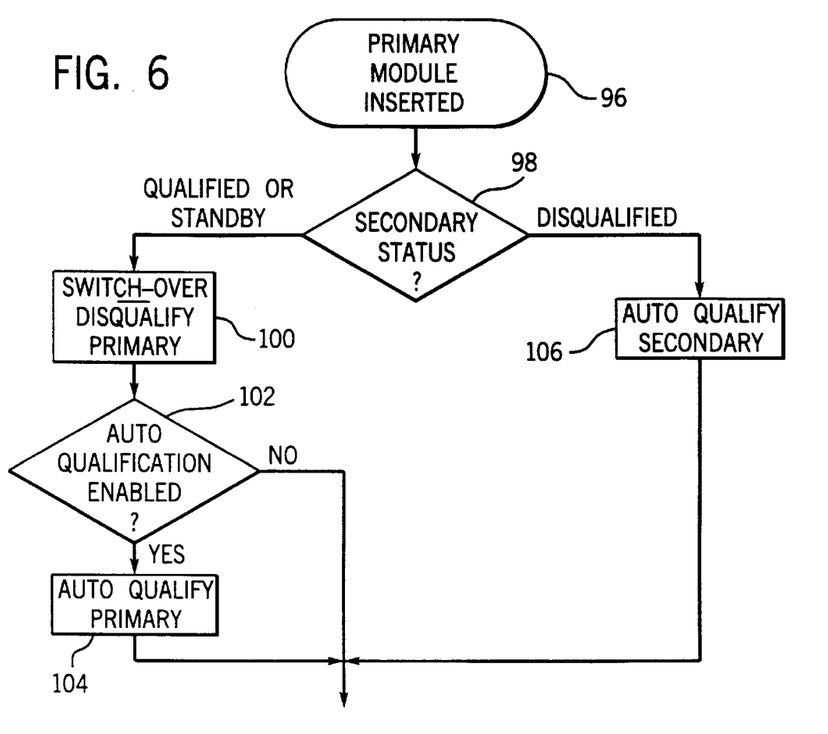
FIG. 6 is a figure similar to FIG. 5 showing the steps executed when a primary module is inserted into the primary controller.

Referring now to FIG. 5 and FIG. 6, if any module 16 is removed from or inserted into a primary controller 12, the system back-up modules 26 will respond in different ways depending on whether the secondary controller 12 is in a standby, qualified or disqualified mode.

The standby state is set by the user; the qualified and disqualified modes are determined by whether the controllers have coherence. Generally, but as will be defined further below, a qualified secondary controller 12 has had the qualification process completed and is ready to assume control if a switch-over signal is received from the system back-up module 26. Similarly, a disqualified secondary controller 12 has not been qualified or has failed qualification and is not ready to assume control of the controlled process and will refuse such control. In the standby state, the secondary controller 12 has been qualified once and is now locked against further qualification regardless of changes in the primary controller. The purpose of this standby state is to provide a known stable environment that may be returned to when upgrades being tested on the other controller are unsuccessful. A secondary controller 12 in standby mode will assume control, even though it is not necessarily coherent as described above with the primary controller 12.

Referring to FIGS. 4 and 5, when the primary module 16a' is removed from a primary controller 12a at process block 80, then at succeeding decision block 82, the status of the secondary controller 12b as recorded in the configuration flags 65 of the primary controller 12a is determined. If the secondary controller 12b is in a standby mode, then as indicated by process block 84, a switch-over signal 72 is sent from system back-up module 26a to system back-up module 26b. In addition signals 73 and 74 are sent to their respective modules 16 to cause a switch-over of control from the primary controller 12a to the secondary controller 12b. The primary controller 12a then moves to a disqualification state by setting its configuration flags 65 appropriately.

Disqualification of the controller 12a, now the secondary controller, triggers an auto-qualification inquiry indicated by process block 86. The present invention provides for conditional auto-qualification depending on the setting of a configuration flag 65. If that auto-qualification state flag is set to disabled, no qualification is initiated and the new secondary controller 12a remains disqualified with its same user program.

If the conditional auto-qualification flag is set to enabled, the new secondary (former primary) controller 12a is qualified as indicated by process block 88 using the steps described above, thus bringing it into coherence with the user program of controller 12b.

If the status of the secondary controller 12b at the time a primary module is removed per process block 80 is qualified, then per process block 90, there is simply a switch-over from controller 12a to controller 12b, as described with respect to process block 84 in FIG. 5.

Finally, if the secondary controller 12b is disqualified as determined by decision block 82 and the removed module is required by the remaining module 16a as indicated by decision block 91, then the program proceeds to a fault state 92 similar to that provided in normal industrial controllers without back-up provision. Typically, the fault state will return all outputs of the industrial controller to a predetermined "safe" state and provide fault indications to the operator.

Referring now to FIG. 6, a slightly different procedure is followed if a primary module 16a is inserted into the primary controller 12a as detected by the system back-up module 26a, as indicated by process block 96. In this case, the status of the secondary controller 12b is again investigated as indicated by decision block 98 through a query of the appropriate configuration flags 65.

If the secondary controller 12b is in a standby or qualified mode, a switch-over of control to the secondary controller 12b is performed and the primary controller 12a is disqualified per process block 100. Next the status of auto-qualification state is checked in process block 102, and depending on that check, a qualification of the former primary processor 12a (new secondary) is performed in process block 104. Process blocks 100, 102, and 104 correspond in function to process blocks 84, 86 and 88 of FIG. 5.

If at decision block 98 the status of the secondary controller 12b is disqualified, the program proceeds to process block 106 where the secondary controller 12b is instructed to perform a qualification to bring it back into coherence with the primary controller 12a.

Figure 7:
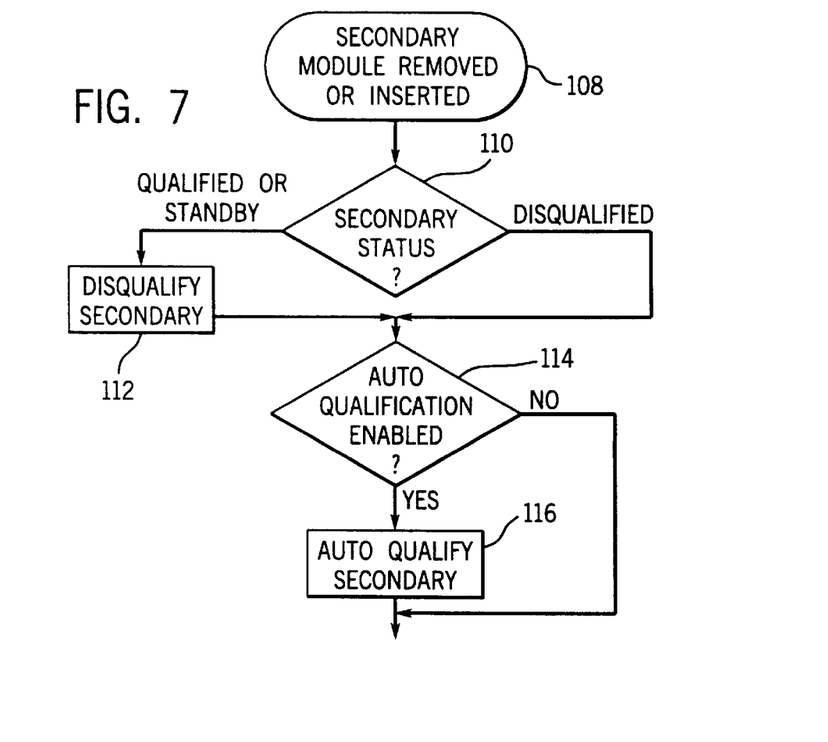
FIG. 7 is a figure similar to FIGS. 5 and 6 of steps executed by the operating system of a secondary controller in response to removal or insertion of a functional module of the secondary controller.

For both the situations of FIG. 5 and FIG. 6, modules 16a are inserted or removed from the primary controller 12a, i.e., the controller performing the control at the time of the removal or insertion. Referring now to FIG. 7, if a module 16b is inserted or removed from the secondary controller 12b (or the controller 12a after it has switched control functions over to the controller 12b) as indicated by process block 108, then the system back-up modules 26b again determine the status of its own secondary controller 12b as indicated by decision block 110. If the secondary controller is in standby or qualified mode, then the secondary controller 12b is disqualified as indicated by process block 112. The program then proceeds to decision block 114 described below.

Alternatively, if the secondary controller is disqualified, then after decision block 110, the program proceeds to decision block 114 and the autoqualification state flag is checked as was described at process blocks 86 and 102 of FIGS. 5 and 6. If qualification is to occur, then the program proceeds to process block 116 and an auto-qualification of the secondary controller is performed as described above. Otherwise, no qualification is performed.

Generally, as module 16 is removed from the backplane 18, it does not create a system failure on the system failure line described with respect to FIGS. 2 and 3. If a controller 12*a* has a qualified secondary 12*b*, the system back-up module 26*a*, upon receiving a system fail signal from the module 16*a*, ceases the user program, causes a switch-over of control to the secondary controller 12*b* and enters a disqualified secondary state. The modules themselves await instructions from the system back-up module for the purpose of an orderly shutdown and start-up of communications, but if no instructions are received, enter a disqualified secondary state, assuming that the system back-up module is the module that has failed.

It will be understood from the above discussion of FIGS. 5, 6 and 7 that the combination of standby mode as described by those figures, and the conditional auto-qualification, both of which may be programmed by flags in the configuration register, are such as to permit the simple upgrading of an industrial controller 12*a* by removal and insertion of modules therein. The following examples will describe the steps by which upgrading may be performed.

Example 1

The following steps may be taken to upgrade a functional module 16*a* of primary controller 12*a* with a qualified secondary controller 12*b* when qualification is possible between modules of different revisions. Qualification is enabled.

1. The module 16*a* is removed from the rack 14 of processor 12*a*. Result: Per the flow chart of FIG. 5, removal is detected by system back-up module 26*a* (at process block 80), which causes a switch-over to a qualified secondary processor 12*b* (per process block 90).

2. Module 16*a* is upgraded in hardware or firmware while control continues in controller 12*b* with the controller 12*a* disqualified.

3. Module 16*a* is re-installed in controller 12*a*. Result: Per the flow chart of FIG. 7, insertion is detected at process block 108 and disqualified controller 12*a* performs a qualification per process block 116, becoming a qualified secondary to controller 12*b*.

4. Corresponding module 16*b* to the one upgraded in the controller 12*a* is removed from controller 12*b*. Result: Per the flow chart of FIG. 5, removal is detected by system back-up module 26*a* (at process block 80), which causes a switch-over to a qualified secondary processor 12*a* (per process block 90).

5. Module 16*b* is upgraded in hardware or firmware while control continues in controller 12*a* with the controller 12*b* disqualified.

6. Module 16*b* is re-installed in controller 12*b*. Result: Per the flow chart of FIG. 7, insertion is detected at process block 108 and disqualified controller 12*b* performs a qualification per process block 116, becoming a qualified secondary to controller 12*b*.

Example 2

Similar steps may be used to upgrade both controllers 12*a* and 12*b* by installing an additional module 16 to those already present. Again controller 12*a* is initially a primary controller with a qualified secondary controller 12*b*. Qualification is enabled.

1. New module 16*a* is added to primary controller 12*a*. Result: Per FIG. 6, the added module is detected by system back-up module 26*a* (at process block 96), which causes switchover. Qualification is successfully performed per process block 106.

2. Corresponding new module 16*b* is added to controller 12*b*. Result: Per FIG. 6, the added module is detected at process block 96, switchover performed at block 100 and qualification is performed successfully per process block 104 as both controllers now have the same modules.

Example 3

Alternatively, the new module may be added first to the secondary chassis 12*b* in the following steps.

1. New module 16*b* is added to secondary chassis 12*b*. Result: Per FIG. 7, the added module is detected by system back-up module 26*a* (at process block 108), which causes secondary controller 12*b* to become disqualified. Qualification is successfully completed at process block 116.

2. Corresponding new module 16*a* is added to primary controller 12*a*. Result: Per FIG. 6 the added module is detected at process block 96 and causes switchover at block 100 and qualifying at block 104.

Example 4

In the following examples, it is assumed that controller 12*a* is initially the primary controller and controller 12*b* the secondary controller in a qualified state. In these examples, however, the conditional auto-qualification is disabled. Generally, this permits upgrading of the control program or module firmware, while locking out qualification so as to ensure that a copy of the unchanged program is preserved in the event of a failure of the upgrades. The following steps may be performed.

1. The qualified secondary controller 12*b* is placed in standby (this disables auto-qualification) and its control program is upgraded The actual sequence may be a disqualification of the secondary controller, and editing of its program (for example) and a placing of the secondary controller in standby or simply placing the controller in standby originally. If the controller is first disqualified, then a switchover cannot occur during the upgrading process. If the controller is first placed in standby, a switchover can occur during the upgrading process.

Result: Because secondary controller 12*b* is in standby, the primary's program will not cause a qualification that might overwrite the upgrade.

Updating of the I/O table 62 in the primary continues and the secondary controller 12*b* will accept a switch-over.

2. By user command, a switch-over from controller 12*a* to standby secondary controller 12*b* ("swap to standby" command) is initiated.

Result: The primary controller 12*a* becomes a secondary controller in standby mode. Qualification of new secondary controller 12*a* to the upgraded program of the new primary controller 12*b* is prevented by the previous deactivation of the auto-qualify mode of controller 12*a*.

3. If the upgrade results in a system fault, an automatic switchover will return control to the original processor.

4. If the upgrade does not result in a fault but is unacceptable, processor 12*a* is returned to control with the original program by user commanded switch-over. The user can then attempt further edits to the program in processor 12*b* or initiate qualification which will cross load the original program from 12*a* to 12*b*.

5. If the upgrade is acceptable, the user can initiate qualification which will crossload the upgraded program from 12b to 12a.

The standby mode may also be used to allow a new program to be developed off-line and loaded into the secondary controller 12b by:

(1) disqualifying the secondary (2) loading the new program, and (3) placing the controller in standby

Example 5

Conversely, editing of the program on the primary controller 12a may be accomplished while holding the secondary controller in standby (loaded with the original program) with the following steps.

1. The secondary controller 12b is placed in standby state, this disables the auto-qualification.

2. The program 60 in one or more functional modules 16a of primary controller 12a is upgraded while controller 12b is in standby.

Result: Controller 12b does not qualify itself because it is in standby, thereby preserving the original version of the program 60.

3. If the upgraded program results in a fault condition, an automatic switchover will return control to the original program in controller 12b.

4. If the upgraded program does not result in a fault but is unacceptable, the user can return control to the original program by initiating a user commanded switchover.

Result: The original program is executed again, while the upgrades are protected against overwriting by the process of qualification.

5. If the upgrade is acceptable, the standby secondary can be qualified by user command.

The above description has been that of a preferred embodiment of the present invention. It will occur to those that practice the art that many modifications may be made without departing from the spirit and scope of the invention. For example, in a computing system where components communicate freely with each other, particular hardware or operating programs may be distributed among different components and hence, for example, the back-up functions of the back-up module need not be performed in a particular unit but may be spread out among units. In order to apprise the public of the various embodiments that may fall within the scope of the invention, the following claims are made.

We claim:

1. A secondary industrial controller providing redundancy for a primary industrial controller, the primary industrial controller having primary functional modules and having a primary memory containing a user program of instructions for execution to control an industrial process, and further holding data reflecting the state of the industrial process separate from the user program, the secondary industrial controller:

(a) a secondary functional module;

(b) a secondary memory including:

(i) a version of the user program; and (ii) a state flag settable by a user command;

(c) a backup circuit communicating with the memory and the functional modules and operating to:

(i) detect a lack of coherence between the primary industrial controller and the secondary industrial controller; and (ii) when a lack of coherence of detected at (i) and only when the state flag is enabled, copy the user program from the primary controller to the secondary memory.

2. The secondary controller of claim 1 wherein the back up circuit further operates to initiate execution of the program in the secondary memory to control the industrial process upon receipt of a switch-over signal unless:

(1) a lack of coherence is detected and the state flag is disabled.

3. The secondary controller of claim 2 wherein the back-up circuit receives as the switch-over signal, a signal from the primary controller indicating a condition consisting of the group of:

(a) a failure of a primary functional module;

(b) removal of a primary functional module; and (c) insertion of a primary functional module.

4. The secondary controller of claim 1 wherein the back-up circuit monitors the secondary functional modules and detects a lack of coherence when there is a change in the number of secondary modules in the secondary controller.

5. The secondary controller of claim 1 wherein the back-up circuit monitors the primary functional modules and detects a lack of coherence when there is a change in the number of the primary modules in the primary controller.

6. The secondary controller of claim 1 wherein the back-up circuit monitors changes in the user program in the primary controller and detects a lack of coherence when the user program is changed.

7. A method of testing a primary controller having a back-up secondary industrial controller, the primary controller having primary functional modules and having a primary memory containing a user program for execution to control an industrial process, the secondary industrial controller having secondary functional modules and a secondary memory including a version of the user program and a state flag set by a user command, the controller module further having a back-up circuit communicating with the memory and the functional modules and operating to:

(i) detect a lack of coherence between the primary functional modules and the secondary functional modules and between the user program and the version of the user program;

(ii) when a lack of coherence is detected at (i) and only when the state flag is not enabled, copy the user program from the primary controller to the secondary memory, the method comprising the steps of:

(a) execute the user program in the primary memory of the primary controller to control the industrial process;

(b) upgrade at least one of the secondary function modules and the user program in the secondary controller and enable the state flag in the secondary controller;

(c) switch over to execute the upgraded version of the program in the secondary memory of the secondary controller to control the industrial process; and (d) following step (c), when the upgraded version of the program fails to execute properly in the secondary controller, return to step (a) to otherwise disable the state flag.

* * * * *